US012803101B2

(12) United States Patent
Jung

(10) Patent No.: US 12,803,101 B2
(45) Date of Patent: Nov. 17, 2026

(54) VACUUM HOPPER PRECHARGER

(71) Applicant: TM Plaza Co., Ltd., Ulsan (KR)

(72) Inventor: Yong Gyu Jung, Ulsan (KR)

( * ) Notice: Subject to any disclaimer, the term of this patent is extended or adjusted under 35 U.S.C. 154(b) by 557 days.

(21) Appl. No.: 18/283,562

(22) PCT Filed: Feb. 21, 2022

(86) PCT No.: PCT/KR2022/002518
§ 371 (c)(1),
(2) Date: Sep. 22, 2023

(87) PCT Pub. No.: WO2022/255592
PCT Pub. Date: Dec. 8, 2022

(65) Prior Publication Data

US 2024/0186643 A1 Jun. 6, 2024

(30) Foreign Application Priority Data

Jun. 1, 2021 (KR) ........................ 10-2021-0070589

(51) Int. Cl.

| | |
|---|---|
| ***H01M 10/44*** | (2006.01) |
| ***H01M 50/30*** | (2021.01) |
| ***H01M 50/609*** | (2021.01) |
| ***H01M 50/691*** | (2021.01) |

(52) U.S. Cl.
CPC ......... *H01M 50/30* (2021.01); *H01M 10/441* (2013.01); *H01M 50/609* (2021.01); *H01M 50/691* (2021.01)

(58) Field of Classification Search
CPC ............................ H01M 50/30; H01M 50/609
See application file for complete search history.

(56) References Cited

FOREIGN PATENT DOCUMENTS

| | | | | |
|---|---|---|---|---|
| JP | 2014-116233 A | 6/2014 | | |
| KR | 100690026 B1 | * | 3/2007 | .......... H01M 10/446 |
| KR | 101865134 B1 | * | 6/2018 | .......... H01M 10/049 |
| KR | 101957503 B1 | * | 3/2019 | .......... H01M 10/446 |
| KR | 10-2326581 B1 | | 11/2021 | |

OTHER PUBLICATIONS

PE2E translation of Kim, Wang Tae (KR100690026), published Mar. 8, 2007 (Year: 2007).*
PE2E translation of Choe, Yong Arm (KR101865134), published Jun. 7, 2018 (Year: 2018).*
PE2E translation of Jung, Yong Gyu (KR101957503), published Mar. 12, 2019 (Year: 2019).*

* cited by examiner

*Primary Examiner* — Elizabeth Insler
(74) *Attorney, Agent, or Firm* — KORUS Patent, LLC; Seong Il Jeong

(57) ABSTRACT

A vacuum hopper precharger includes: a base frame (20) having a lower plate (21), an upper plate (23), and an intermediate plate (24); a tray (30) located on a top of the intermediate plate (24), and adapted such that a plurality of secondary batteries (100) are seated therein; a gas removal part (40) installed on a bottom of the upper plate (23) of the base frame (20), and intended to remove gas inside the secondary batteries (100); charging parts (50) each installed over the lower plate (21) of the base frame (20), and intended to charge the secondary batteries (100); moving parts (60) fixed to the intermediate plate (24), and intended to move the gas removal part (40) and the charging parts (50) vertically; and a control unit (70) intended to control the gas removal part (40), the charging parts (50), and the moving parts (60).

3 Claims, 13 Drawing Sheets

Prior Art

Prior Art

Prior Art

VACUUM HOPPER PRECHARGER

TECHNICAL FIELD

The present invention relates to a vacuum hopper precharger, and more specifically, to a vacuum hopper precharger by which the electrolytes of secondary batteries and the gas contained in the electrolytes are discharged to the outside through a gas removal part and then the electrolytes are supplied back to the secondary batteries, and the secondary batteries are charged through charging portions, thereby enabling the supply of electrolyte and charging to be performed at the same time.

BACKGROUND ART

Secondary batteries, which are easily applied depending on the product group and have electrical characteristics such as high energy density, are widely used not only in mobile devices but also in electric vehicles (EVs) or hybrid electric vehicles (HEV) that are driven by electrical drive sources. These secondary batteries are attracting attention as a new energy source for improving eco-friendliness and energy efficiency not only because they have the primary advantage of being able to dramatically reduce the use of fossil fuels but also because they do not generate any by-products attributable to energy use.

Types of secondary batteries currently widely used include lithium ion batteries, lithium polymer batteries, nickel cadmium batteries, nickel hydrogen batteries, and nickel zinc batteries. The operating voltages of these unit secondary battery cells, i.e., unit battery cells, range from approximately 25V to 45V. Therefore, when a higher output voltage is required, a battery pack is formed by connecting a plurality of battery cells in series. Furthermore, a battery pack may be constructed by connecting multiple battery cells in parallel depending on the charge/discharge capacity required for the battery pack. Accordingly, the number of battery cells included in the battery pack may be set in various manners depending on the required output voltage or charge/discharge capacity.

Meanwhile, when a battery pack is constructed by connecting a plurality of battery cells in series/parallel, a method of constructing a battery pack by first constructing at least one battery module consisting of at least one battery cell and then adding other components using the at least one battery module is commonly used.

Such battery cells are lithium polymer batteries, and there is a tendency for pouch-type secondary batteries to have recently been widely used. Pouch-type secondary batteries have been widely used in recent years because they have high energy density per unit weight and volume and it is easy to make battery cells thinner and lighter.

The conventional method of manufacturing battery cells as a pouch-type secondary battery is as follows:

First, a positive electrode plate and a negative electrode plate are manufactured, a separator is placed between them, and then they are stacked on one another to produce an electrode assembly. Thereafter, a plasticizer (di-butyl phthalate (DBP)) is extracted from the electrode assembly manufactured as described above, electrode tabs are welded to electrode leads of the electrode assembly, and the electrode assembly is embedded inside a pouch case. After the electrode assembly has been embedded in the pouch case, an electrolyte is injected into the inside of the pouch case to impregnate the electrode assembly with the electrolyte. When the electrolyte is injected as described above, the edges of the pouch case are joined by heat fusion to seal the pouch case. Thereafter, an aging process is performed to stabilize the assembled battery cell as described above, and then a charge/discharge process is performed to activate the battery cell. However, during the charge/discharge process, the irreversible reaction of the electrolyte and additives occurs due to the formation of an SEI layer, and gas is generated at this time. The gas inside the pouch case needs to be removed. If the gas is not removed, it may cause battery cell failure. Therefore, a degassing process is performed using a device for degassing a battery cell to remove the gas inside the pouch case.

As a preceding patent related to the above-described gas removal device for a battery cell, i.e., a vacuum hopper precharger, the gas removal device for the secondary battery of patent document 1 (Korean Patent Registration No. 10-0433836) is provided with a chamber 200 installed on the top of a base 100, as shown in FIG. 1, and this chamber 200 includes an upper chamber 210 adapted to moves vertically and a lower chamber 220 installed on the top surface of the base 100 by fixed legs 110.

In addition, the battery cell degassing device of patent document 2 (Korean Patent Application Publication No. 10-2018-0062835) is a battery cell degassing device for degassing a battery cell provided with a gas pocket portion 59 as shown in FIG. 2, the battery cell degassing device comprising: a chamber cover 100 configured such that the battery cell is detachably seated thereon; a vacuum chamber 200 coupled with the chamber cover 100 in response to the sliding of the chamber cover 100 in the horizontal direction and adapted to accommodate the battery cell in a vacuum atmosphere; a piercing unit 300 provided in the vacuum chamber 200 and adapted to pierce a portion of the gas pocket portion 59; and a pressing unit 400 provided in the vacuum chamber 200 to be spaced apart from the piercing unit 300, and adapted to discharge gas inside the battery cell to the outside of the battery cell while flattening the upper and lower surfaces of the battery cell.

However, the above conventional technologies remove the gas inside the secondary battery or battery cell by placing the chamber in a vacuum state to remove the gas inside the secondary battery or battery cell. Accordingly, there is a problem in that it takes a lot of time to generate a vacuum in the chamber and to release the vacuum inside the chamber by injecting air after removing the gas.

Meanwhile, in order to solve the above problem, the present applicant previously applied for and registered the vacuum hopper precharger of patent document 3 (Korean Patent Registration No. 10-1957503). As shown in FIG. 3, the vacuum hopper precharger of patent document 3 includes: a base frame 20 placed on the ground and provided with an internal space 21; a gas removal part 30 installed in the upper portion of the internal space 21 of the base frame 20, and intended to remove gas inside a secondary battery 100; a lifting part 40 installed in the lower part of the internal space 21 of the base frame 20 at a position corresponding to the gas removal part 30, adapted such that the secondary battery 100 is placed thereon, and intended to move the secondary battery 100 vertically; and a control unit 50 adapted to control the gas removal part 30 and the lifting part 40.

However, the vacuum hopper precharger is configured to suck the electrolyte of a rectangle-shaped secondary battery and the gas contained in the electrolyte through a vacuum hopper, to discharge the gas contained in the electrolyte to the outside, and to store the electrolyte in the vacuum nozzle of the vacuum hopper and then supply the electrolyte into the secondary battery. With this in mind, the present applicant has developed a device that can supply the electrolyte of a circular secondary battery and charge the circular secondary battery.

DISCLOSURE

Technical Problem

The present invention has been conceived to overcome the above-described conventional problems, and an object of the present invention is to provide a new type of vacuum hopper precharger by which the electrolytes of secondary batteries and the gas contained in the electrolytes are discharged to the outside through a gas removal part and then the electrolytes are supplied back to the secondary batteries, and the secondary batteries are charged through charging parts, thereby enabling the supply of electrolytes and charging to be performed at the same time.

Another object of the present invention is to provide a new type of vacuum hopper precharger by which the electrolytes of secondary batteries and the gas contained in the electrolytes are sucked through a vacuum hopper, the gas contained in the electrolytes is discharged to the outside, and the electrolytes are stored in the vacuum nozzles of the vacuum hopper and then supplied back to the secondary batteries, thereby reducing defects of the secondary batteries and increasing the lifespan of the secondary batteries.

Technical Solution

According to an aspect of the present invention for accomplishing the above objects, there is provided a vacuum hopper precharger including: a base frame (20) having a lower plate (21) fixed to a ground, an upper plate (23) formed at ends of support bars (22) that are formed upward from a top of the lower plate (21), and an intermediate plate (24) formed on the support bars (22); a tray (30) located on a top of the intermediate plate (24), and adapted such that a plurality of secondary batteries (100) are seated therein; a gas removal part (40) installed on a bottom of the upper plate (23) of the base frame (20), and intended to remove gas inside the secondary batteries (100); charging parts (50) each installed over the lower plate (21) of the base frame (20), and intended to charge the secondary batteries (100); moving parts (60) fixed to the intermediate plate (24), and intended to move the gas removal part (40) and the charging parts (50) vertically; and a control unit (70) intended to control the gas removal part (40), the charging parts (50), and the moving parts (60).

In the vacuum hopper precharger according to the present invention, the gas removal part (40) may include: a fixing part (41) installed on a bottom of the upper plate (23); and a vacuum hopper (80 or 90) coupled to a bottom of the fixing part (41), and intended to remove gas inside the secondary batteries (100).

In the vacuum hopper precharger according to the present invention, the vacuum hopper (80) may include: a coupling bar (81) coupled to the bottom of the fixing part (41); a vacuum manifold (82) coupled to a bottom of the coupling bar (81), and provided with a plurality of vacuum holes (821) that are formed to penetrate from a top surface to a bottom surface; a cover (83) formed to cover a top of the vacuum manifold (82); couplers (84) coupled to front surfaces of both sides of the vacuum manifold (83), adapted to communicate with the vacuum holes (821) of the vacuum manifold (82), and connected to a vacuum pump and an air pump on one side thereof; a connecting pipe (85) adapted to connect between the couplers (84); vacuum nozzles (86) each formed in a cylindrical shape having a hollow (861) formed therein, coupled through a bottom of the vacuum hole (821) of the vacuum manifold (82), and adapted to store an electrolyte sucked from the secondary battery (100); opening/closing elements (87) each adapted such that a top thereof is coupled to the cover (83), inserted through a top of the vacuum hole (821) of the vacuum manifold (82), adapted such that a bottom thereof is formed in a size corresponding to the hollow (861) of the vacuum nozzle (86) and is located in an upper part of the vacuum nozzle (86), and configured to allow the upper hollow (861) of the vacuum nozzle (86) to be selectively opened and closed in response to a vertical movement of the vacuum nozzle (86); and a support holder (88) adapted such that a top thereof is coupled to both side ends of the vacuum manifold (82) and a bottom thereof is intended to support lower portions of the vacuum nozzles (86).

In the vacuum hopper precharger according to the present invention, each of the vacuum nozzles (86) may include: a body (863) formed in a cylindrical shape having a hollow 861 formed therein, provided with stop protrusions (862) on an upper portion of an outer peripheral surface thereof so that the body (863) is inserted through the bottom of the vacuum hole (821) of the vacuum manifold (82), and adapted to store the electrolyte sucked from the secondary battery (100); an O-ring (864) formed on the stop protrusions (862) of the body (863), and intended to seal the vacuum hole (821) of the vacuum manifold (82); an elastic member (865) formed under the stop protrusions (862) of the body (863); a fixer (866) formed under the elastic member (865), and adapted to prevent the elastic member (865) from being separated; and a pad (867) coupled to an end of the body (863), and adapted to come into close contact with a top of the secondary battery (100).

In the vacuum hopper precharger according to the present invention, the vacuum hopper (90) may include: a coupling bar (91) coupled to a bottom of the fixing part (41); a vacuum manifold (92) coupled to a bottom of the coupling bar (91), and provided with a plurality of vacuum depressions (921) that are formed from a lower portion to an upper portion; a communication pipe (93) formed to allow the vacuum depressions (921) of the vacuum manifold (92) to communicate with each other; couplers (94) coupled to front surfaces of both sides of the vacuum manifold (92), adapted to communicate with the vacuum depressions (921) of the vacuum manifold (92), and connected to a vacuum pump and an air pump on one side; vacuum nozzles (95) each formed in a cylindrical shape having a hollow (951)) formed therein, coupled through a bottom of the vacuum depression (921) of the vacuum manifold (92), and adapted to store the electrolyte sucked from the secondary battery (100); and a support holder (96) adapted such that a top thereof is coupled to both ends of the vacuum manifold (92) and a bottom thereof is intended to support lower portions of the vacuum nozzles (95).

In the vacuum hopper precharger according to the present invention, each of the vacuum nozzles (95) may include: a body (953) formed in a cylindrical shape having a hollow (951) formed therein, provided with a through hole (952) that is formed on an outer circumferential surface of the upper side, and adapted to store the electrolyte sucked from the secondary battery (100); a seal (954) formed from a top surface of the body (953) to a lower side of the through hole (952), and adapted to seal the hollow (951); a cover body (955) formed in a cylindrical shape, formed to surround an outer peripheral surface of an upper portion of the body (953), and provided with a bottom that is fixed to the support holder (96); an O-ring (956) formed in a top of the hollow (951) of the body (953), and adapted to come into close contact with an inner circumferential surface of the cover body (955) and seal the vacuum depression (942) of the vacuum manifold (92); an elastic member (957) formed under the cover body (955); a fixer (958) formed on a lower portion of the body (953), and adapted to prevent the elastic member (957) from being separated; and a pad (959) coupled to an end of the body (953), and adapted to come into close contact with a top of the secondary battery (100).

In the vacuum hopper precharger according to the present invention, the base frame (20) has an auxiliary frame (25) installed below the intermediate plate (24); and each of the charging parts (50) includes: temperature sensors (51) installed in the fixer (252) of the auxiliary frame (25), and connected to the control unit (70) to check the temperature of the secondary battery (100); and negative/positive electrode probes (52) installed in the fixer (252) of the auxiliary frame (25), and intended to charge the secondary battery (100).

Advantageous Effects

According to the vacuum hopper precharger of the present invention, the electrolytes of the secondary batteries and the gas contained in the electrolytes are discharged to the outside through the gas removal part and then the electrolytes are supplied back to the secondary batteries, and the secondary batteries are charged through the charging parts, that there are the effects of enabling the supply of electrolytes and charging to be performed at the same time.

Furthermore, the electrolytes of the secondary batteries and the gas contained in the electrolytes are sucked through the vacuum hopper, the gas contained in the electrolytes is discharged to the outside, and the electrolytes are stored in the vacuum nozzles of the vacuum hopper and then supplied back to the secondary batteries, so that there are the effects of reducing defects of the secondary batteries and increasing the lifespan of the secondary batteries.

MODE FOR INVENTION

Figure 1:
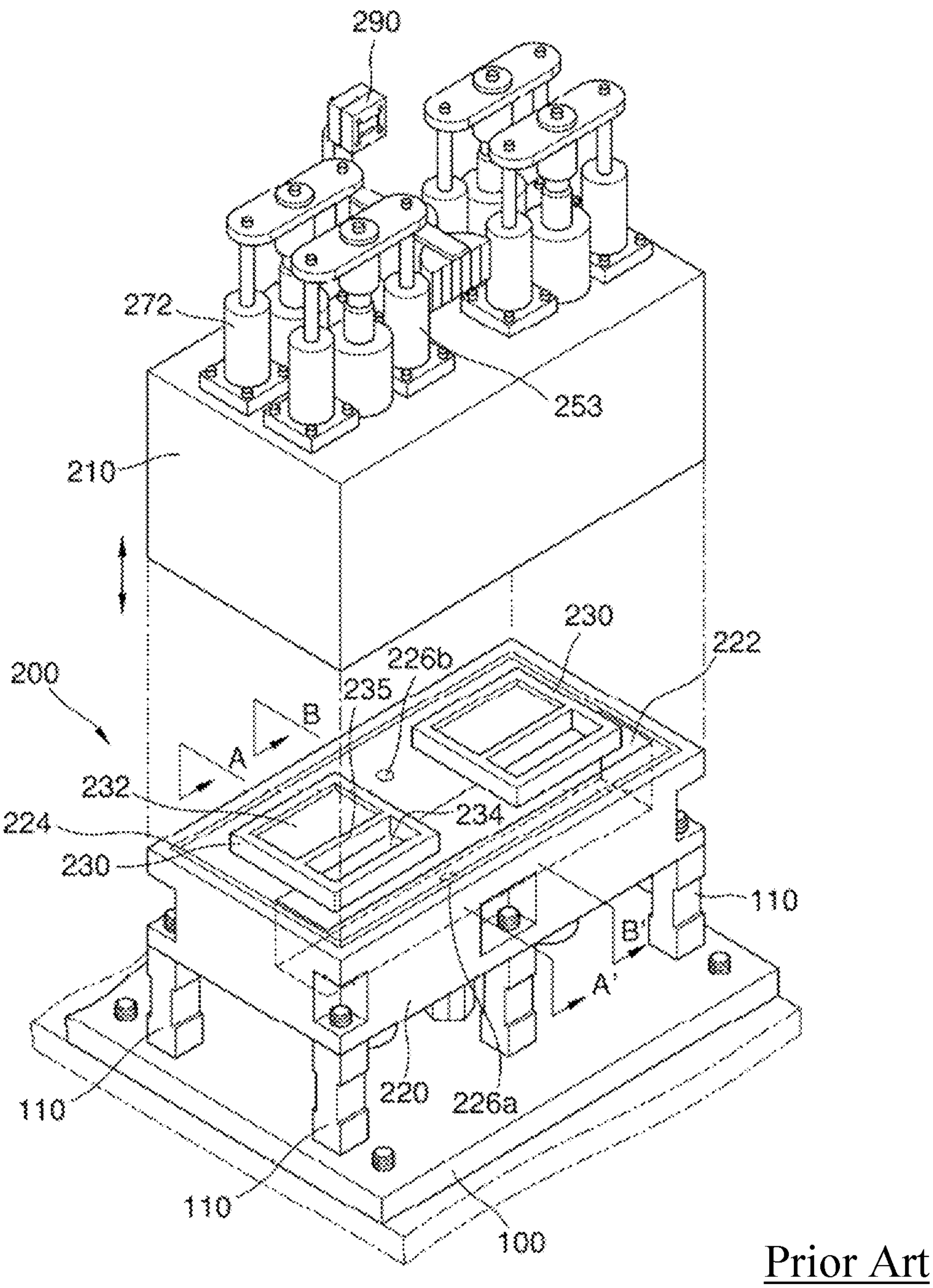
FIGS. 1 to 3 are drawings illustrating prior art.
Figure 2:
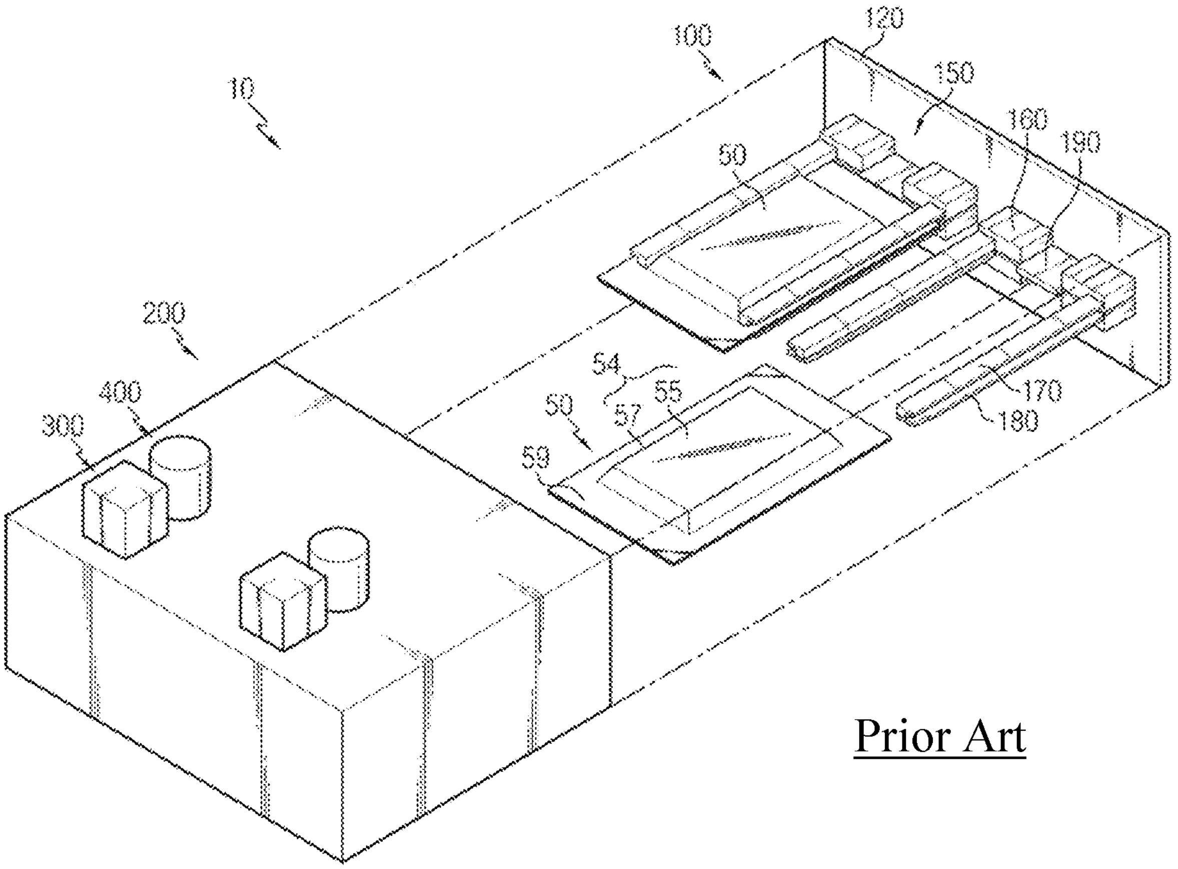
Figure 3:
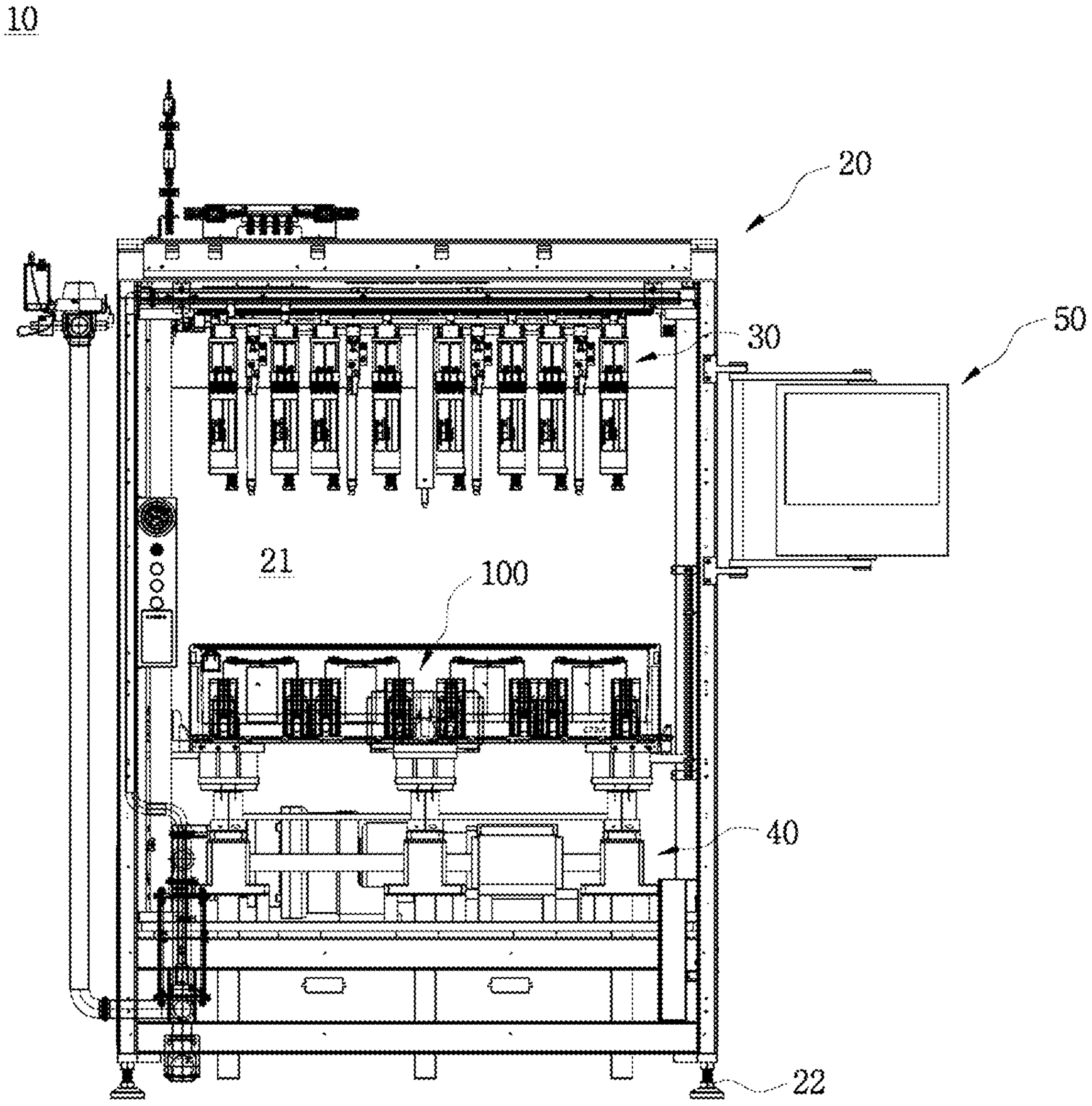
Figure 4:
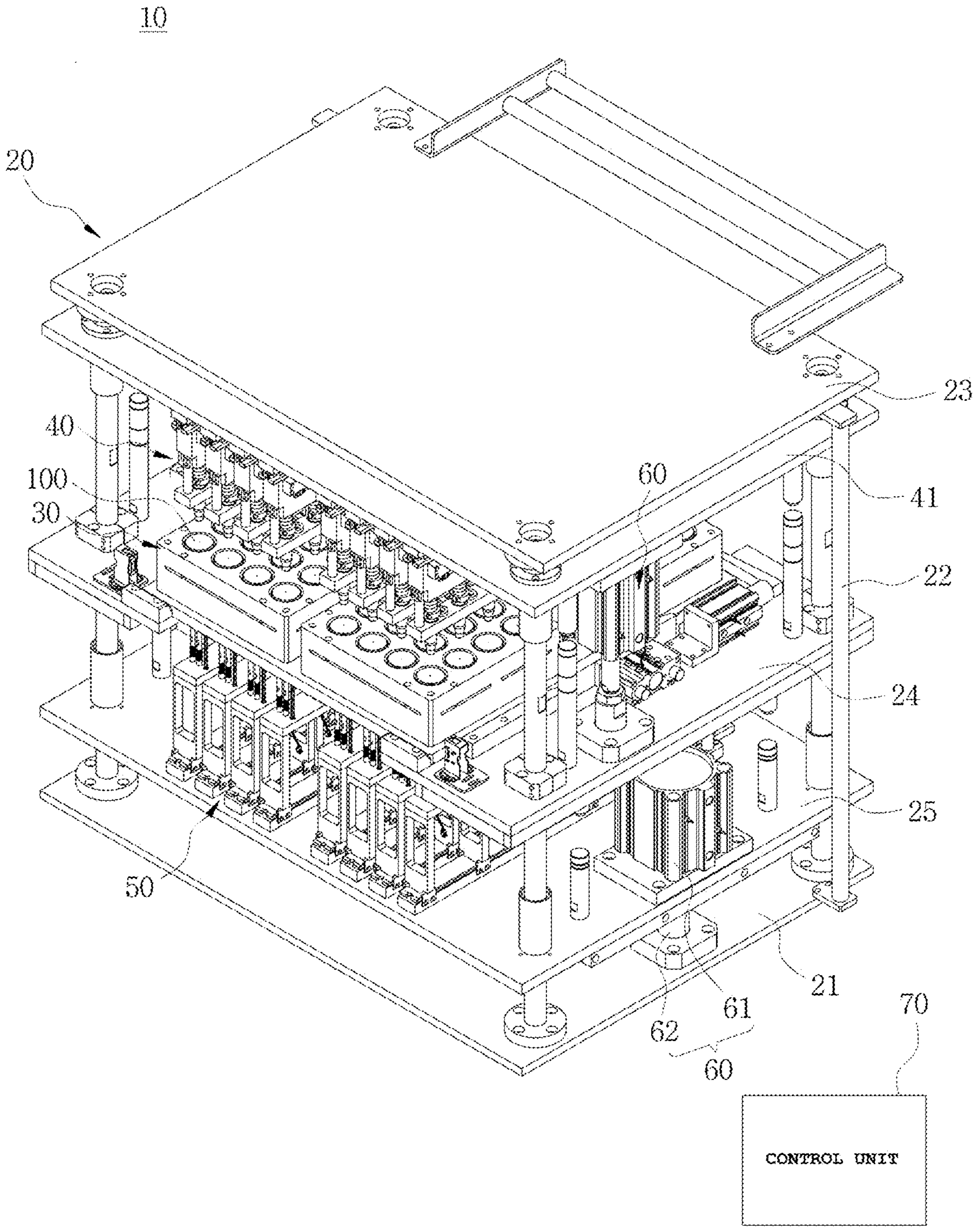
FIG. 4 is a perspective view of a vacuum hopper precharger according to a preferred embodiment of the present invention.
Figure 5:
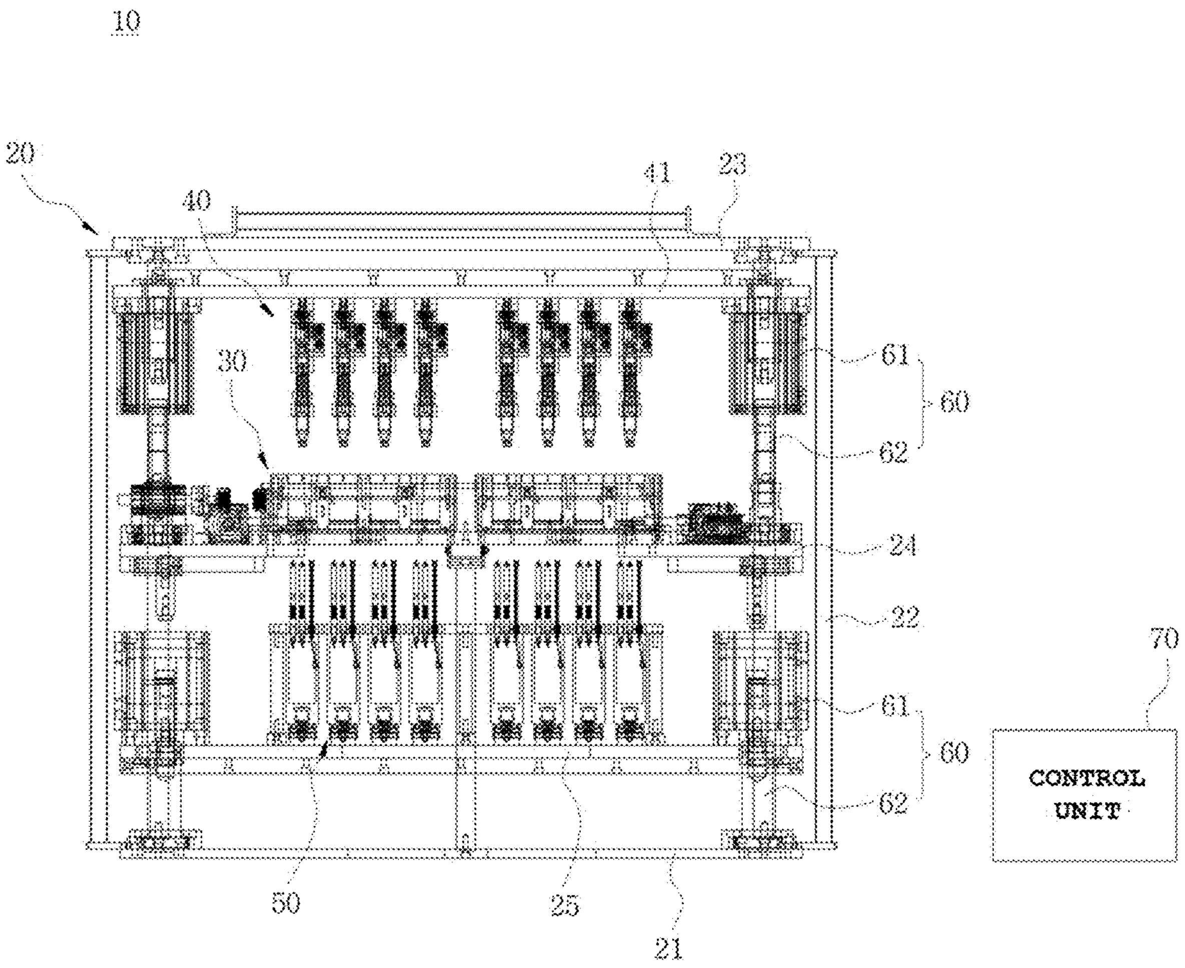
FIG. 5 is a front view of the vacuum hopper precharger according to the preferred embodiment of the present invention.
Figure 6:
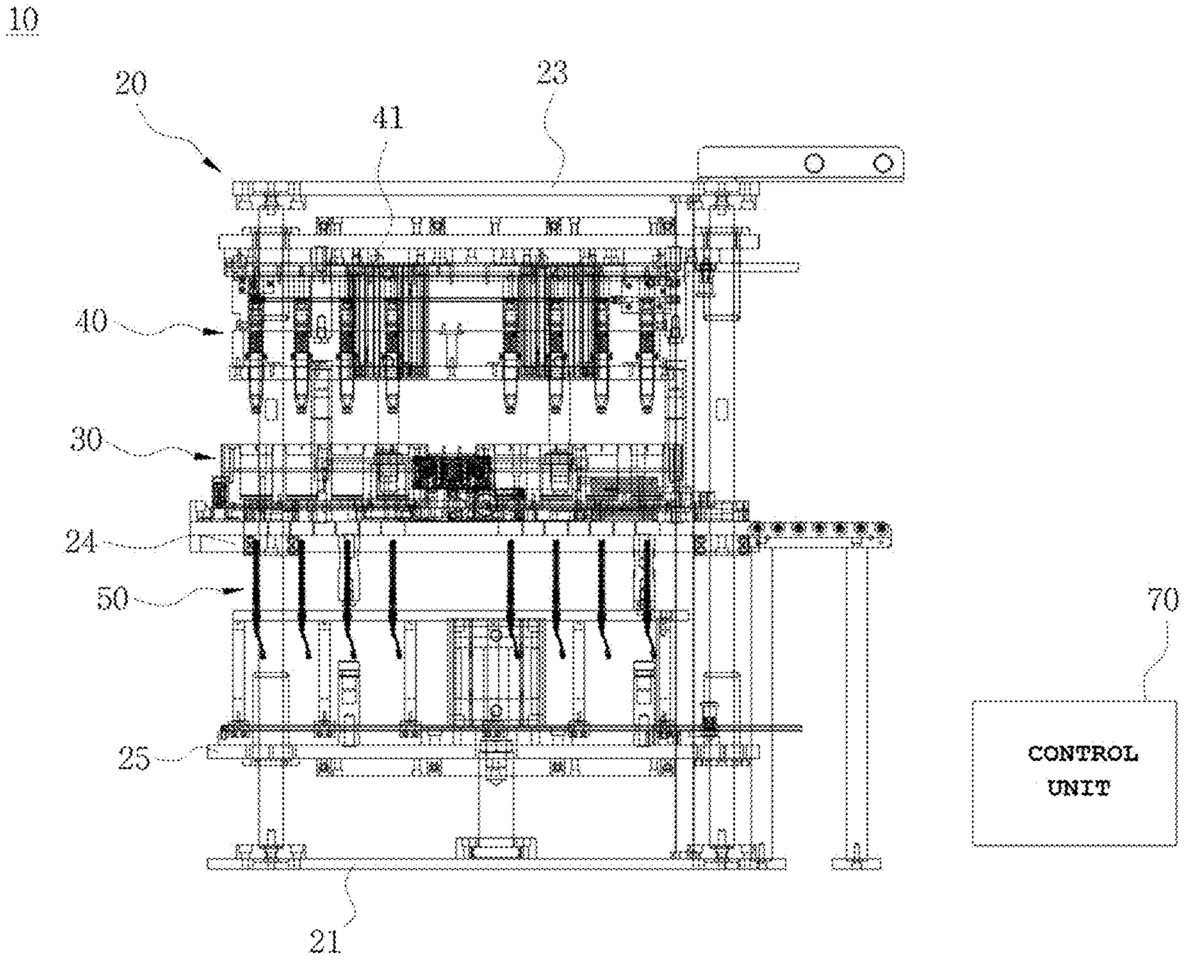
FIG. 6 is a side view of the vacuum hopper precharger according to the preferred embodiment of the present invention.

Embodiments of the present invention will be described in detail below with reference to the accompanying drawings.

Preferred embodiments of the present invention will be described in detail below based on the attached drawings. In FIGS. 4 to 13, components that perform the same function are given the same reference numerals. Meanwhile, in the illustrations of the drawings and detailed descriptions, detailed descriptions and illustrations of the specific technical configurations and operations of elements that are not directly related to the technical features of the present invention are omitted. Only technical configurations related to the present invention are briefly shown or described.

Referring to FIGS. 4 to 13, the vacuum hopper precharger 10 according to a preferred embodiment of the present invention includes a base frame 20, a tray 30, a gas removal part 40, charging parts 50, moving parts 60, and a control unit 70.

The base frame 20 has a lower plate 21 fixed to the ground, has an upper plate 23 formed at the ends of support bars 22 formed upward from the top of the lower plate 21, and has an intermediate plate 24 formed on the support bars 22.

Meanwhile, in the base frame 20, an auxiliary frame 25 is formed between the lower plate 21 and the intermediate plate 24, and is moved vertically by the moving parts 60. The auxiliary frame 25 includes an auxiliary plate 251 formed in the shape of a plate, and a plurality of fixers 252 formed on the upper side of the auxiliary plate 251 and configured to fix the charging parts 50.

In addition, a plurality of secondary batteries 100 are seated on the tray 30, and the tray 30 is located on the top of the intermediate plate 24 of the base frame 20.

Meanwhile, although not shown, a heating unit is constructed inside the tray 30, so that the heat generated from the heating unit is circulated inside the vacuum hopper precharger and transferred to all the secondary batteries, thereby improving the activity of electrolytes inside the secondary batteries. Accordingly, a lot of residual gas and impurities can be discharged, thereby increasing the purity of the secondary batteries.

The gas removal part 40 is installed on the bottom of the upper plate 23 of the base frame 20, and is intended to remove gas inside the secondary batteries 100. The gas removal part 40 includes a fixing part 41 installed on the bottom of the upper plate 23, and a vacuum hopper 80 coupled to the bottom of the fixing part 41 and intended to remove gas inside the secondary batteries 100.

Figure 7:
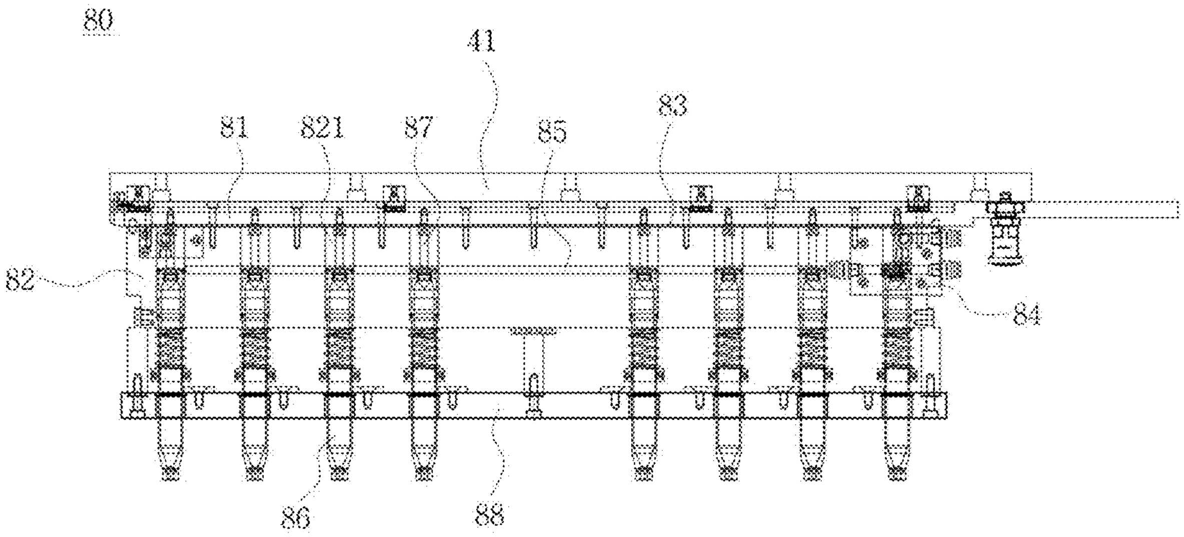
FIG. 7 is a view showing a vacuum hopper in the vacuum hopper precharger according to the preferred embodiment of the present invention.
Figure 8:
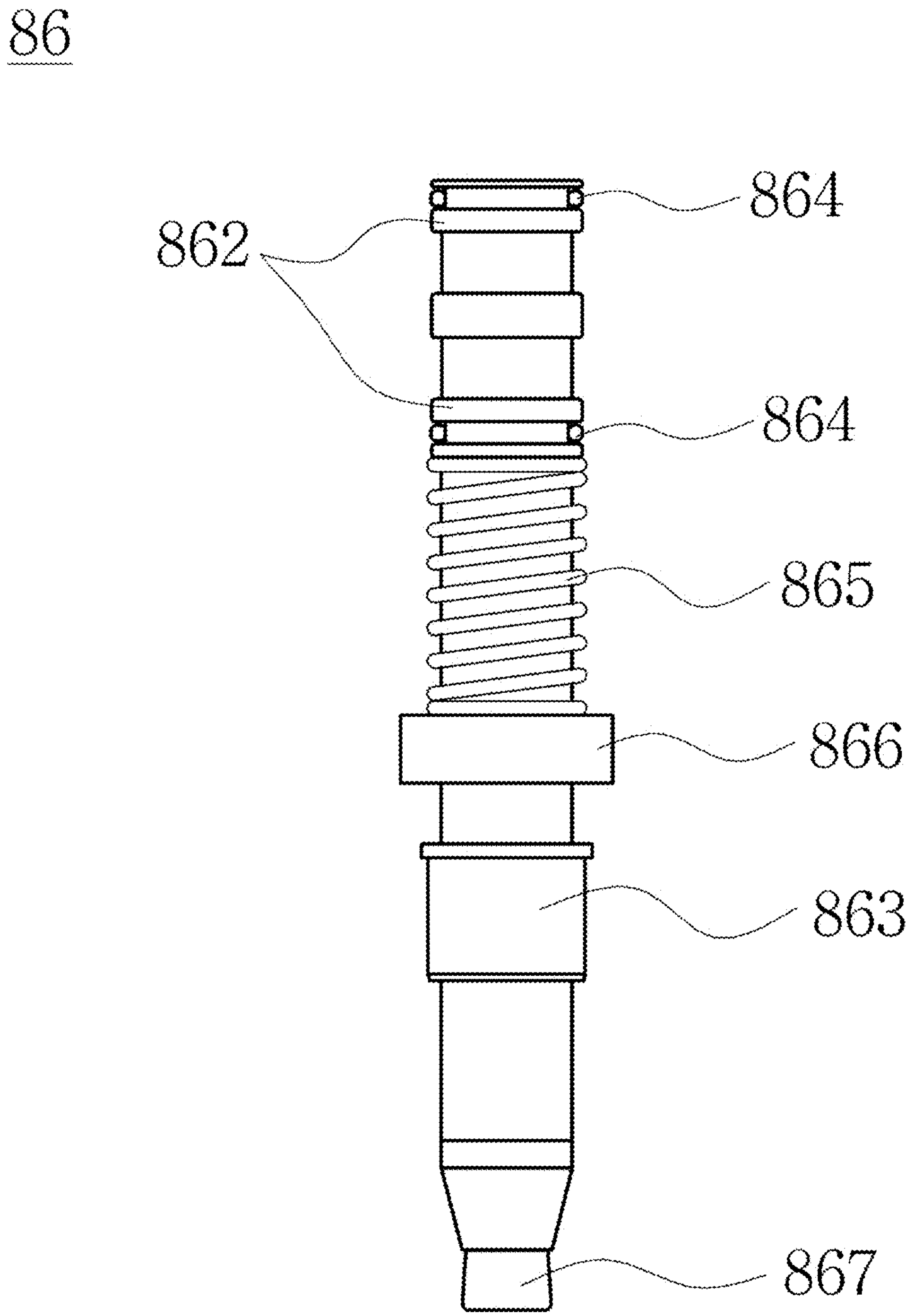
FIG. 8 is a view showing a vacuum nozzle of the vacuum hopper in the vacuum hopper precharger according to the preferred embodiment of the present invention.
Figure 9:
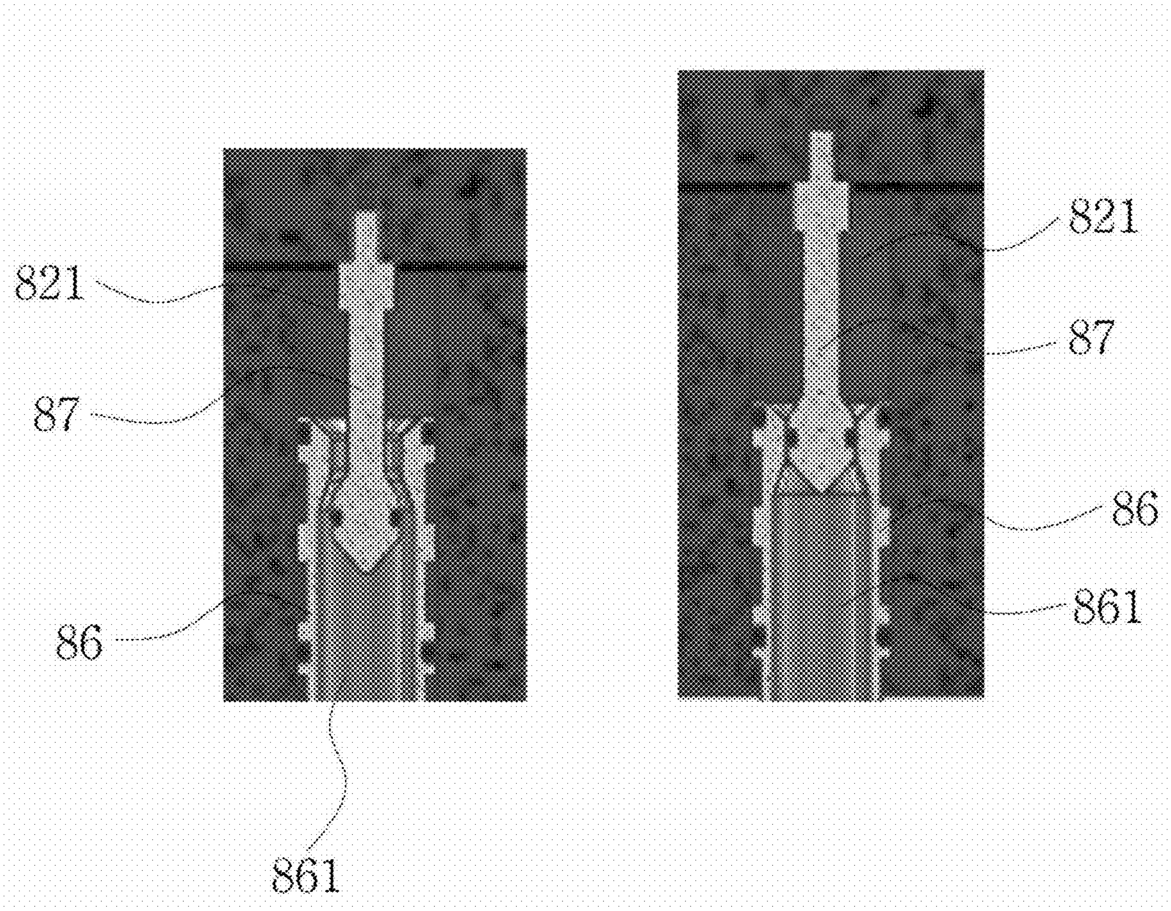
FIG. 9 is a diagram showing the operation of the vacuum nozzle of the vacuum hopper of FIG. 7.

FIG. 7 is a view showing the vacuum hopper in the vacuum hopper precharger according to the preferred embodiment of the present invention, FIG. 8 is a view showing a vacuum nozzle of the vacuum hopper in the vacuum hopper precharger according to the preferred embodiment of the present invention, and FIG. 9 is a diagram showing the operation of the vacuum nozzle of the vacuum hopper of FIG. 7.

Referring to FIGS. 7 to 9, the vacuum hopper 80 will be described. The vacuum hopper 80 is configured to include: a coupling bar 81 coupled to the bottom of the fixing part 41; a vacuum manifold 82 coupled to the bottom of the coupling bar 81, and provided with a plurality of vacuum holes 821 that are formed to penetrate from the top surface to the bottom surface; a cover 83 formed to cover the top of the vacuum manifold 82; couplers 84 coupled to the front surfaces of both sides of the vacuum manifold 83, adapted to communicate with the vacuum holes 821 of the vacuum manifold 82, and connected to a vacuum pump and an air pump on one side thereof; a connecting pipe 85 adapted to connect between the couplers 84; vacuum nozzles 86 each formed in a cylindrical shape having a hollow 861 formed therein, coupled through the bottom of the vacuum hole 821 of the vacuum manifold 82, and adapted to store the electrolyte sucked from the secondary battery 100; opening/closing elements 87 each adapted such that the top thereof is coupled to the cover 83, inserted through the top of the vacuum hole 821 of the vacuum manifold 82, adapted such that the bottom thereof is formed in a size corresponding to the hollow 861 of the vacuum nozzle 86 and is located in the upper part of the vacuum nozzle 86, and configured to allow the upper hollow 861 of the vacuum nozzle 86 to be selectively opened and closed in response to the vertical movement of the vacuum nozzle 86; and a support holder 88 adapted such that the top thereof is coupled to both side ends of the vacuum manifold 82 and the bottom thereof is intended to support the lower portions of the vacuum nozzles 86.

Meanwhile, each of the vacuum nozzles 86 is configured to include: a body 863 formed in a cylindrical shape having a hollow 861 formed therein, provided with stop protrusions 862 on the upper portion of the outer peripheral surface thereof so that the body 863 is inserted through the bottom of the vacuum hole 821 of the vacuum manifold 82, and adapted to store the electrolyte sucked from the secondary battery 100; an O-ring 864 formed on the stop protrusions 862 of the body 863, and intended to seal the vacuum hole 821 of the vacuum manifold 82; an elastic member 865 formed under the stop protrusions 862 of the body 863; a fixer 866 formed under the elastic member 865, and adapted to prevent the elastic member 865 from being separated; and a pad 867 coupled to an end of the body 863, and adapted to come into close contact with the top of the secondary battery 100.

The operation of the vacuum hopper 80 having the above-described configuration will be described with reference to FIG. 9. When the vacuum nozzles 86 come into close contact with the tops of the secondary batteries 100, the vacuum nozzles 86 move upward and are spaced apart from the opening/closing elements 87, thereby generating spaces. Thereafter, when the vacuum pump is operated, the vacuum holes 821 of the vacuum manifold 82 and the hollows 861 of the vacuum nozzles 86 enter a vacuum state, and the electrolytes of the secondary batteries 100 are located in the hollows 861 of the vacuum nozzles 86. In this case, the gas contained in the electrolytes is discharged to the exhaust device of the vacuum pump. When the gas contained in the electrolytes is discharged, air is injected into the vacuum manifold 82 through the air pump. Once air has been injected into the vacuum manifold 82, the vacuum state of the vacuum holes 821 of the vacuum manifold 82 and the hollows 861 of the vacuum nozzles 86 is destructed, so that the electrolytes located in the hollows 861 of the vacuum nozzles 86 are injected into the secondary batteries 100.

Figure 10:
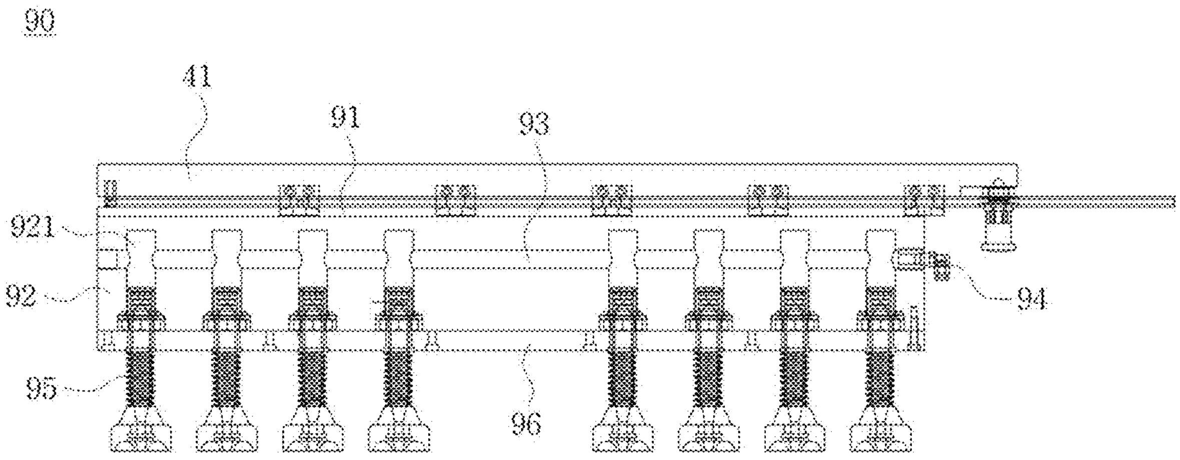
FIG. 10 is a diagram showing another embodiment of the vacuum hopper in the vacuum hopper precharger according to the preferred embodiment of the present invention.
Figure 11:
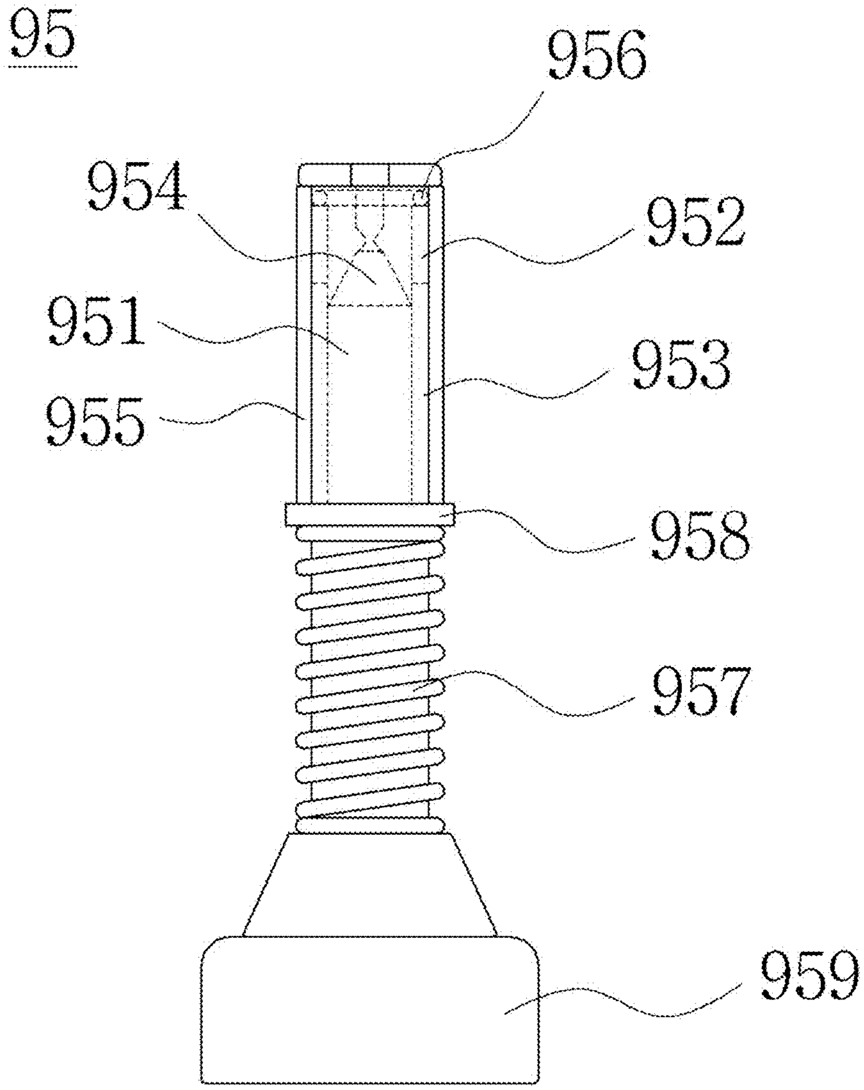
FIG. 11 is a view showing a vacuum nozzle of the vacuum hopper according to another embodiment in the vacuum hopper precharger according to the preferred embodiment of the present invention.
Figure 12:
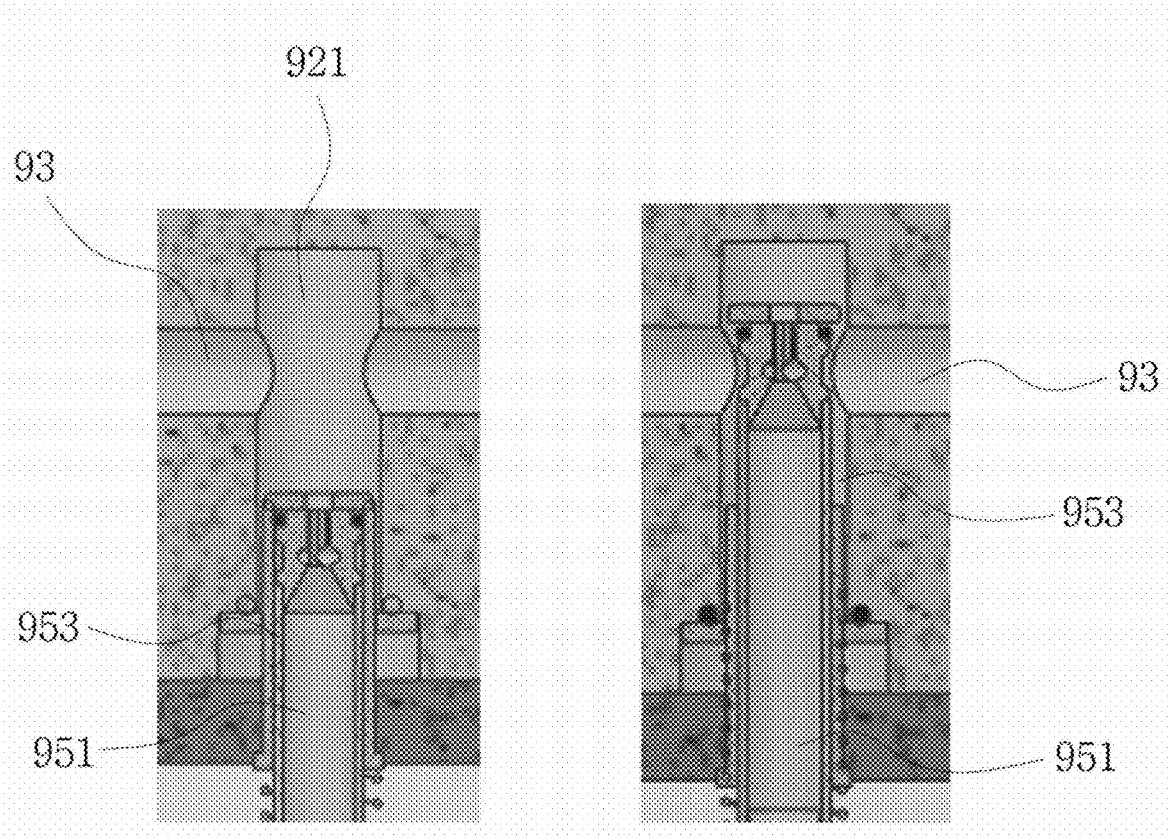
FIG. 12 is a diagram showing the operation of the vacuum nozzle of the vacuum hopper of FIG. 10.
Figure 13:
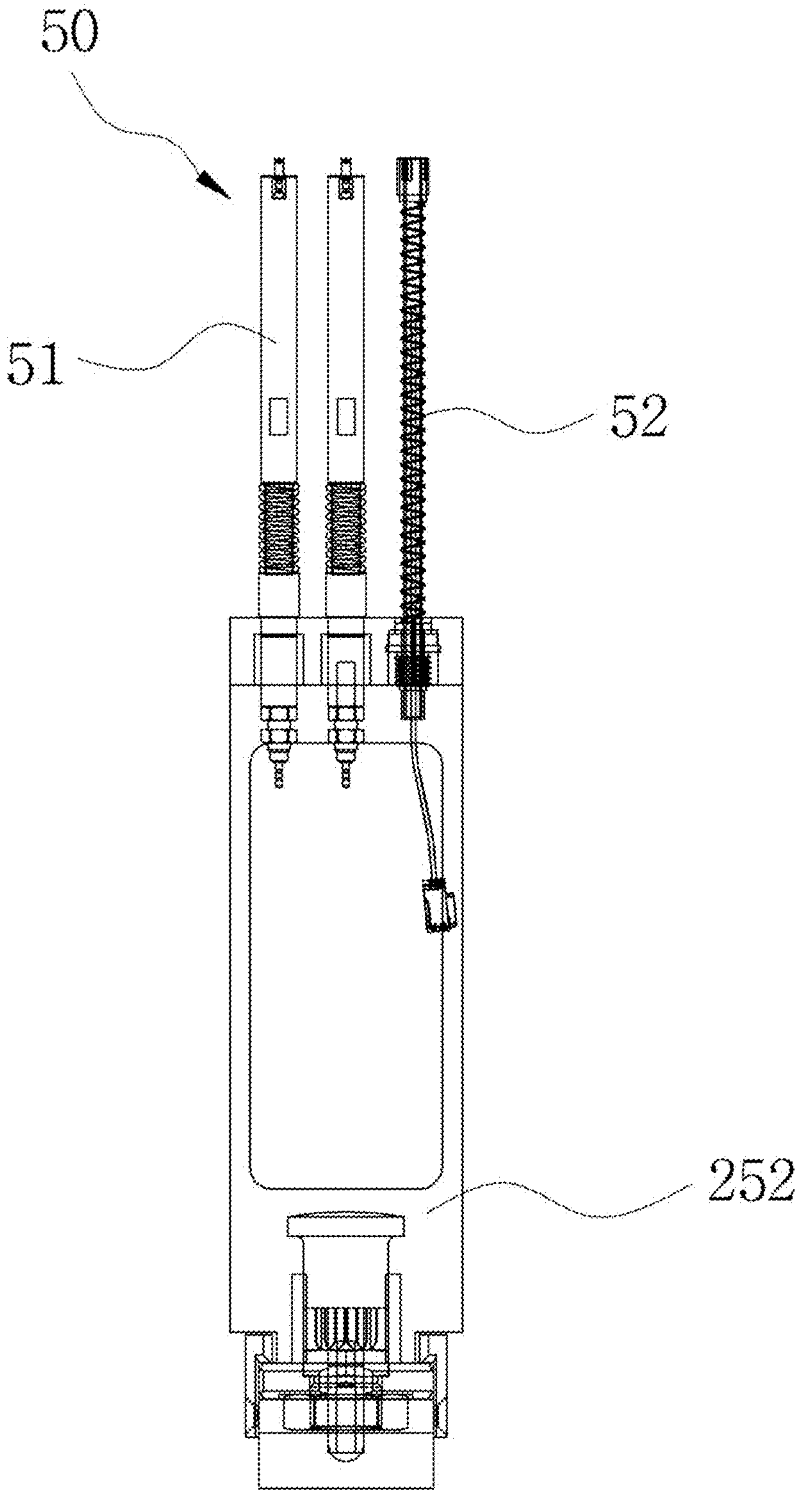
FIG. 13 is a diagram showing a charging part in the vacuum hopper precharger according to the preferred embodiment of the present invention.

FIG. 10 is a diagram showing another embodiment of the vacuum hopper in the vacuum hopper precharger according to the preferred embodiment of the present invention, FIG. 11 is a view showing a vacuum nozzle of the vacuum hopper according to another embodiment in the vacuum hopper precharger according to the preferred embodiment of the present invention, and FIG. 12 is a diagram showing the operation of the vacuum nozzle of the vacuum hopper of FIG. 10.

Referring to FIGS. 10 to 12, another embodiment of the vacuum hopper in the vacuum hopper precharger according to the preferred embodiment of the present invention will be described. The vacuum hopper 90 is configured to include: a coupling bar 91 coupled to the bottom of the fixing part 41; a vacuum manifold 92 coupled to the bottom of the coupling bar 91, and provided with a plurality of vacuum depressions 921 that are formed from the lower portion to the upper portion; a communication pipe 93 formed to allow the vacuum depressions 921 of the vacuum manifold 92 to communicate with each other; couplers 94 coupled to the front surfaces of both sides of the vacuum manifold 92, adapted to communicate with the vacuum depressions 921 of the vacuum manifold 92, and connected to a vacuum pump and an air pump on one side; vacuum nozzles 95 each formed in a cylindrical shape having a hollow 951 formed therein, coupled through the bottom of the vacuum depression 921 of the vacuum manifold 92, and adapted to store the electrolyte sucked from the secondary battery 100; and a support holder 96 adapted such that the top thereof is coupled to both ends of the vacuum manifold 92 and the bottom thereof is intended to support the lower portions of the vacuum nozzles 95.

Meanwhile, each of the vacuum nozzles 95 is configured to include: a body 953 formed in a cylindrical shape having a hollow 951 formed therein, provided with a through hole 952 that is formed on the outer circumferential surface of the upper side, and adapted to store the electrolyte sucked from the secondary battery 100; a seal 954 formed from the top surface of the body 953 to the lower side of the through hole 952 and adapted to seal the hollow 951; a cover body 955 formed in a cylindrical shape, formed to surround the outer peripheral surface of the upper portion of the body 953, and provided with a bottom that is fixed to the support holder 96; an O-ring 956 formed in the top of the hollow 951 of the body 953, and adapted to come into close contact with the inner circumferential surface of the cover body 955 and seal the vacuum depression 942 of the vacuum manifold 92; an elastic member 957 formed under the cover body 955; a fixer 958 formed on the lower portion of the body 953, and adapted to prevent the elastic member 957 from being separated; and a pad 959 coupled to an end of the body 953, and adapted to come into close contact with the top of the secondary battery 100.

The operation of the vacuum hopper 90 having the above-described configuration will be described with reference to FIG. 12. When the vacuum nozzles 95 come into close contact with the tops of the secondary batteries 100, the vacuum nozzles 95 are moved upward, and the through holes 952 formed in the bodies 953 of the vacuum nozzles 95 are made to communicate with the vacuum depressions 921 of the vacuum manifold 92. Thereafter, when the vacuum pump is operated, the vacuum depressions 921 of the vacuum manifold 92 and the hollows 951 of the vacuum nozzles 95 enter a vacuum state, and the electrolytes of the secondary batteries 100 are located in the hollows 951 of the vacuum nozzles 95. In this case, the gas contained in the electrolyte is discharged to the exhaust device of the vacuum pump. When the gas contained in the electrolyte is discharged, air is injected into the vacuum manifold 92 through the air pump. Once air has been injected into the vacuum manifold 92, the vacuum state of the vacuum depressions 921 of the vacuum manifold 92 and the hollows 951 of the vacuum nozzles 95 is destructed, so that the electrolytes located in the hollows 951 of the vacuum nozzles 95 are injected into the secondary batteries 100.

As described above, the electrolytes of the secondary batteries 100 and the gas contained in the electrolytes are sucked in through the vacuum hopper 80 or 90. The gas contained in the electrolytes is discharged to the outside, and the electrolytes are stored in the vacuum nozzles 86 or 95 of the vacuum hopper 80 or 90 and then injected back into the secondary batteries 100. Accordingly, there are the effects of reducing defects in the secondary batteries 100 and increasing their lifespan.

Each of the charging parts 50 are installed over the lower plate 21 of the base frame 20, and are intended to charge the secondary batteries 100. Each of the charging parts 50 is configured to include: temperature sensors 51 installed in the fixer 252 of the auxiliary frame 25, and connected to the control unit 70 to check the temperature of the secondary battery 100; and negative/positive electrode probes 52 installed in the fixer 252 of the auxiliary frame 25, and intended to charge the secondary battery 100. In this case, although not shown in the drawings, the temperature sensors 51 are connected to the control unit 70 through cables. In addition, the temperature sensors 51 and negative/positive electrode probes 52 of the charging part 50 are each formed in plural pieces so that the auxiliary frame 25 corresponds to the fixers 252.

The moving parts 60 are fixed to the intermediate plate 24, and are intended to move the gas removal part 40 and the charging parts 50 vertically. Each of the moving parts 60 includes a cylinder 61 and a cylinder rod 62.

The cylinder 61 is installed on the bottom of the fixing part 41 of the gas removal part 40 or on the top of the auxiliary frame 50 of the base frame 20. One side of the cylinder rod 61 is connected to the cylinder 61, and the other side thereof is coupled to the intermediate plate 24 of the base frame 20 or the lower plate 21 of the base frame 20.

The control unit 70 is intended to control the gas removal part 40, the charging parts 50, and the moving parts 60. Although the control unit 70 is shown as being installed separate from the base frame 20 in the vacuum hopper precharger 10 according to the preferred embodiment of the present invention, it may be installed on a side of the base frame 20.

As described above, according to the vacuum hopper precharger according to the present invention, the electrolytes of the secondary batteries and the gas contained in the electrolytes are discharged to the outside through the gas removal part and then the electrolytes are supplied back to the secondary batteries, and the secondary batteries are charged through the charging parts. Accordingly, there is the effect of enabling the supply of electrolytes and charging to be performed at the same time.

In addition, the electrolytes of the secondary batteries and the gas contained in the electrolytes are sucked in through the vacuum hopper, and the gas contained in the electrolytes is discharged to the outside and the electrolytes are stored in the vacuum nozzles of the vacuum hopper and then supplied back to the secondary batteries. Accordingly, there are the effects of reducing defects in the secondary batteries and increasing their lifespan.

While the vacuum hopper precharger according to the preferred embodiment of the present invention described above has been illustrated based on the above description and drawings, this is merely an example. It will be readily understood by a person skilled in the art that various changes and modifications may be made without departing from the technical spirit of the present invention.

The invention claimed is:

1. A vacuum hopper precharger comprising:

a base frame (20) having a lower plate (21) fixed to a ground, an upper plate (23) formed at ends of support bars (22) that are formed upward from a top of the lower plate (21), and an intermediate plate (24) formed on the support bars (22);

a tray (30) located on a top of the intermediate plate (24), and adapted such that a plurality of secondary batteries (100) are seated therein;

a gas removal part (40) installed on a bottom of the upper plate (23) of the base frame (20), and intended to remove gas inside the secondary batteries (100), the gas removal part (40) comprising a fixing part (41) installed on the bottom of the upper plate (23) and a vacuum hopper (90) coupled to a bottom of the fixing part (41);

charging parts (50) each installed over the lower plate (21) of the base frame (20), and intended to charge the secondary batteries (100);

moving parts (60) fixed to the intermediate plate (24), and intended to move the gas removal part (40) and the charging parts (50) vertically; and a control unit (70) intended to control the gas removal part (40), the charging parts (50), and the moving parts (60), wherein the vacuum hopper (90) comprises:

a coupling bar (91) coupled to the bottom of the fixing part (41);

a vacuum manifold (92) coupled to a bottom of the coupling bar (91), and provided with a plurality of vacuum depressions (921) that are formed from a lower portion to an upper portion;

a communication pipe (93) formed to allow the vacuum depressions (921) of the vacuum manifold (92) to communicate with each other;

couplers (94) coupled to front surfaces of both sides of the vacuum manifold (92), adapted to communicate with the vacuum depressions (921) of the vacuum manifold (92), and connected to a vacuum pump and an air pump on one side;

vacuum nozzles (95) each formed in a cylindrical shape having a hollow (951) formed therein, coupled through a bottom of the vacuum depression (921) of the vacuum manifold (92), and adapted to store an electrolyte sucked from the secondary battery (100); and a support holder (96) adapted such that a top thereof is coupled to both ends of the vacuum manifold (92) and a bottom thereof is intended to support lower portions of the vacuum nozzles (95).

2. The vacuum hopper precharger of claim 1, wherein each of the vacuum nozzles (95) comprises:

a body (953) formed in a cylindrical shape having a hollow (951) formed therein, provided with a through hole (952) that is formed on an outer circumferential surface of the upper side, and adapted to store the electrolyte sucked from the secondary battery (100);

a seal (954) formed from a top surface of the body (953) to a lower side of the through hole (952), and adapted to seal the hollow (951);

a cover body (955) formed in a cylindrical shape, formed to surround an outer peripheral surface of an upper portion of the body (953), and provided with a bottom that is fixed to the support holder (96);

an O-ring (956) formed in a top of the hollow (951) of the body (953), and adapted to come into close contact with an inner circumferential surface of the cover body (955) and seal the vacuum depression (921) of the vacuum manifold (92);

an elastic member (957) formed under the cover body (955);

a fixer (958) formed on a lower portion of the body (953), and adapted to prevent the elastic member (957) from being separated; and a pad (959) coupled to an end of the body (953), and adapted to come into close contact with a top of the secondary battery (100).

3. The vacuum hopper precharger of claim 1, wherein:

the base frame (20) has an auxiliary frame (25) installed below the intermediate plate (24), the auxiliary frame (25) having a fixer (252); and each of the charging parts (50) comprises:

temperature sensors (51) installed in the fixer (252), and connected to the control unit (70) to check the temperature of the secondary battery (100); and negative/positive electrode probes (52) installed in the fixer (252), and intended to charge the secondary battery (100).

* * * * *